United States Patent
Seguchi et al.

(10) Patent No.: US 7,135,793 B2
(45) Date of Patent: Nov. 14, 2006

(54) STATOR COIL INCLUDING SEQUENTIALLY CONNECTED SEGMENT CONDUCTORS PREFERABLY APPLICABLE TO AN ELECTRIC ROTARY MACHINE

(75) Inventors: Masahiro Seguchi, Oobu (JP); Shinji Kouda, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/126,297

(22) Filed: May 11, 2005

(65) Prior Publication Data
US 2005/0253466 A1    Nov. 17, 2005

(30) Foreign Application Priority Data
May 14, 2004    (JP)    ............... 2004-145637

(51) Int. Cl.
*H02K 11/00*    (2006.01)
*H02K 1/00*    (2006.01)
*H02K 7/00*    (2006.01)

(52) U.S. Cl. ......................... 310/71; 310/184
(58) Field of Classification Search ............... 310/71, 310/67 R, 179, 184
See application file for complete search history.

(56) References Cited

U.S. PATENT DOCUMENTS

| | | | |
|---|---|---|---|
| 4,689,023 A * | 8/1987 | Strong et al. ............ 439/189 |
| 5,646,464 A * | 7/1997 | Sickafus ............... 310/40 MM |
| 5,828,147 A * | 10/1998 | Best et al. .................... 310/71 |
| 5,900,687 A * | 5/1999 | Kondo et al. ................. 310/71 |
| 6,249,956 B1 | 6/2001 | Maeda et al. |
| 6,530,140 B1 | 3/2003 | Maeda et al. |
| 6,552,463 B1 | 4/2003 | Oohashi et al. |
| 6,894,410 B1 * | 5/2005 | Kobayashi et al. ........... 310/71 |
| 6,914,356 B1 * | 7/2005 | Yamamura et al. .......... 310/71 |
| 2002/0047365 A1 * | 4/2002 | Yagyu et al. ................. 310/71 |
| 2002/0067094 A1 * | 6/2002 | Okazaki et al. ............. 310/180 |

FOREIGN PATENT DOCUMENTS

| JP | B2 3118837 | 10/2000 |
|---|---|---|
| JP | A 2001-320848 | 11/2001 |
| JP | A 2002-058189 | 2/2002 |
| JP | A 2003-079090 | 3/2003 |

* cited by examiner

*Primary Examiner*—Darren Schuberg
*Assistant Examiner*—Erik Preston
(74) *Attorney, Agent, or Firm*—Oliff & Berridge, PLC (57) ABSTRACT

A stator coil includes a coil portion wound around a stator core and a terminal board serving as a bus bar array board. The coil portion is arranged by sequentially connected segment conductors. The terminal board is a molded ring plate member disposed adjacently to a head coil end of the coil portion in the axial direction and elongated in the radial direction. The turn number of the stator coil is easily adjustable by selecting an optimum one of a plurality of terminal boards.

10 Claims, 7 Drawing Sheets

STATOR COIL INCLUDING SEQUENTIALLY CONNECTED SEGMENT CONDUCTORS PREFERABLY APPLICABLE TO AN ELECTRIC ROTARY MACHINE

CROSS-REFERENCE TO RELATED APPLICATION

This application is based upon and claims the benefit of priority from earlier Japanese Patent Application No. 2004-145637 filed on May 14, 2004 so that the description of which is incorporated herein by reference.

BACKGROUND OF THE INVENTION

The present invention relates to a stator coil including sequentially connected segment conductors preferably applicable to an electric rotary machine.

From the view point of providing compact automotive electric rotary machines and increasing the output of these machines, a stator coil including sequentially connected segment conductors is preferably employed for an electric rotary machine because this stator coil can reduce the size of the coil end (refer to the Japanese patent No. 3118837 or the Japanese patent application laid-open No. 2002-58189).

For example, the Japanese patent No. 3118837 discloses a U-shaped segment (i.e. a rectangular conductor wire covered with insulating film, which is referred to as a segment conductor in the following description) having a pair of leg portions individually inserted into a pair of slots of a rotor mutually spaced at substantially one magnetic pole pitch, with both end portions protruding out of the rotor and being bent substantially in the circumferential direction. The front ends of the leg portions of respective segments are sequentially connected to arrange a stator coil consisting of sequentially connected segment conductors. Accordingly, the head portions of respective segment conductors cooperatively form a head coil end of the stator coil. The end portions of respective segment conductors protruding from the slots cooperatively form a tail coil end of the stator coil.

However, this kind of segment sequentially connected electric rotary machine requires a special or dedicated facility for forming the stator coil. Usually, the stator coil is differentiated according to the type of automotive vehicle and the purpose of its use. Thus, preparing a special or dedicated facility for each vehicle type is disadvantageous and not practical. To solve this problem, the Japanese patent application laid-open No. 2002-58189 proposes changing the wire connection method of the segment sequentially connected stator coil to change the serial turn number of the stator coil.

However, if the above method is employed for a high voltage, high output automotive driving generator motor, the bus bar arrangement for changing the wire connection will become very complicated and accordingly the work will not be easy.

SUMMARY OF THE INVENTION

In view of the above-described problems, the present invention has an object to provide a stator coil including sequentially connected segment conductors whose wiring arrangement can be easily changed.

In order to accomplish the above and other related objects, the present invention provides a stator coil including sequentially connected segment conductors, wherein each segment conductor includes a pair of leg portions individually inserted into two slots of a stator core spaced at substantially one magnetic pole pitch and one head portion continuously formed with the leg portions and disposed at a head coil end. The leg portions of the segment conductors are sequentially connected at a tail coil end to form a coil group occupying a coil group layer of the slot which has even conductor insertion positions neighboring with each other. The coil group includes plural partial coils being mutually connected for each phase. The stator coil includes a bus bar array board including plural inter-group crossover bus bars and an electric insulating member. The inter-group crossover bus bars are disposed in a circumferential direction or a radial direction to connect end portions of the partial coils. And, the inter-group crossover bus bars are integrally supported in the electric insulating member.

The stator coil of this invention can simplify the work for connecting partial coils because of provision of the bus bar array board which integrates the inter-group crossover bus bars with the insulating member. Furthermore, it is unnecessary to provide crossover wires of partial coils by elongating the segment conductor forming the end portion of a partial coil extending in the circumferential direction or the radial direction to connect the partial coils. The required types of the segment conductors can be simplified and minimized. The work for inserting the segment conductors into the slots and bending or twisting the segments can be simplified. Furthermore, without complicating the work, the inter-group crossover bus bars can be densely disposed. Electric insulation properties can be assured. The electric rotary machine can be downsized. Furthermore, this invention makes it possible to select an optimum bus bar array board to change the connecting pattern of the partial coils. In other words, changing the layout or arrangement of the segment conductors is unnecessary to obtain stator coils differentiated in serial turn number. Furthermore, simple positioning and fixation of the bus bars is realized for the stator coil including sequentially connected segment conductors. The work for welding numerous segment conductors can be performed at a time. The productivity can be improved.

According to a preferred embodiment of the present invention, partial coil connecting bus bars (i.e. bus bars connecting the partial coils) are integrally molded with the insulating member. This arrangement simplifies the work for giving a required spatial layout for respective partial coil connecting bus bar.

According to a preferred embodiment of the present invention, the bus bar array board has inter-group crossover bus bars connecting end portions of plural partial coils respectively belonging to the plural coil groups individually occupying mutually different coil group layers of the slot. This arrangement can enhance the above-described effects.

According to a preferred embodiment of the present invention, the bus bar array board has a terminal bus bar serving as an external connecting terminal which is connected to one end of a phase coil arranged by partial coils of the same phase, and the terminal bus bar protrudes from the insulating member. With this arrangement, the external connecting terminal can be simply formed at a required position.

According to a preferred embodiment of the present invention, the bus bar array board has a neutral bus bar connecting other ends of the phase coils of respective phases, and the neutral bus bar extends in the circumferential direction. This arrangement makes it possible to simply dispose the neutral bus bar at a required position and enhance the above-described effects.

According to a preferred embodiment of the present invention, the neutral bus bar is disposed at a position substantially identical with a core back of the stator core in the radial direction. This arrangement makes it possible to realize a simple layout of the neutral bus bar without causing interference with other bus bars and accordingly can realize a compact electric rotary machine.

According to a preferred embodiment of the present invention, the partial coil connecting bus bar is exposed in a window portion of the insulating member, and is connected to the end portion of the partial coil inserted in the window portion. This arrangement brings the effect of simplifying connection and positioning of the partial coil connecting bus bars and the partial coils.

According to a preferred embodiment of the present invention, the bus bar array board is disposed adjacently to the head coil end in the axial direction and elongated in the radial direction. The partial coil connecting bus bar can be easily connected to the head portion of a cut portion of the segment conductor. The manufacturing processes can be simplified.

According to a preferred embodiment of the present invention, a semiconductor switching element is fixed to the bus bar array board and is connected to one end of a phase coil arranged by partial coils of the same phase. The semiconductor switching element, which is for example used to control or rectify the stator current, can be compactly incorporated in an electric rotary machine. Furthermore, the wiring distance can be shortened and the wiring loss can be reduced.

According to a preferred embodiment of the present invention, the bus bar array board is selectable from a plurality of array boards mutually differentiated in a bus bar arrangement, and the serial turn number of one phase is adjustable by changing a connecting pattern of the partial coils. With this arrangement, the turn number of the stator coil can be easily and adequately changed.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the present invention will be explained hereinafter with reference to attached drawings.

Hereinafter, a stator coil of the present invention will be explained with reference to the following preferred embodiments. However, the present invention is not limited to the following embodiments and accordingly can be modified in various ways within the scope of the present invention.

An electric rotary machine equipped with a stator coil including sequentially connected segment conductors in according to this embodiment has the same structure as that of an ordinary inner rotor type three-phase electric rotary machine. Accordingly, this electric rotary machine has a stator including a stator core and a stator coil. The stator core is fixed to an inner cylindrical surface of the housing of this rotary machine. The stator coil, wound around this stator core, includes sequentially connected segment conductors. A rotor, having magnetic poles at the radial inner side of the stator core, is fixed to a rotary shaft. This electric rotary machine, i.e. a synchronous machine, is conventionally well known in its fundamental structure and its operation.

Furthermore, the stator coil including sequentially connected segment conductors is also known in the art and accordingly details of the stator coil will be understood with reference to, for example, the above-described or other related prior art documents. However, application of the stator coil including sequentially connected segment conductors of this embodiment is not limited to the electric rotary machines disclosed in these prior art documents. For example, the stator coil including sequentially connected segment conductors of this embodiment can be applied to such an electric rotary machine characterized in that two leg portions of a U-shaped segment conductor are individually inserted into a pair of slots of a stator core angularly spaced at substantially one magnetic pole pitch and front ends of these segment conductors are sequentially connected according to other connecting pattern.

Figure 1:
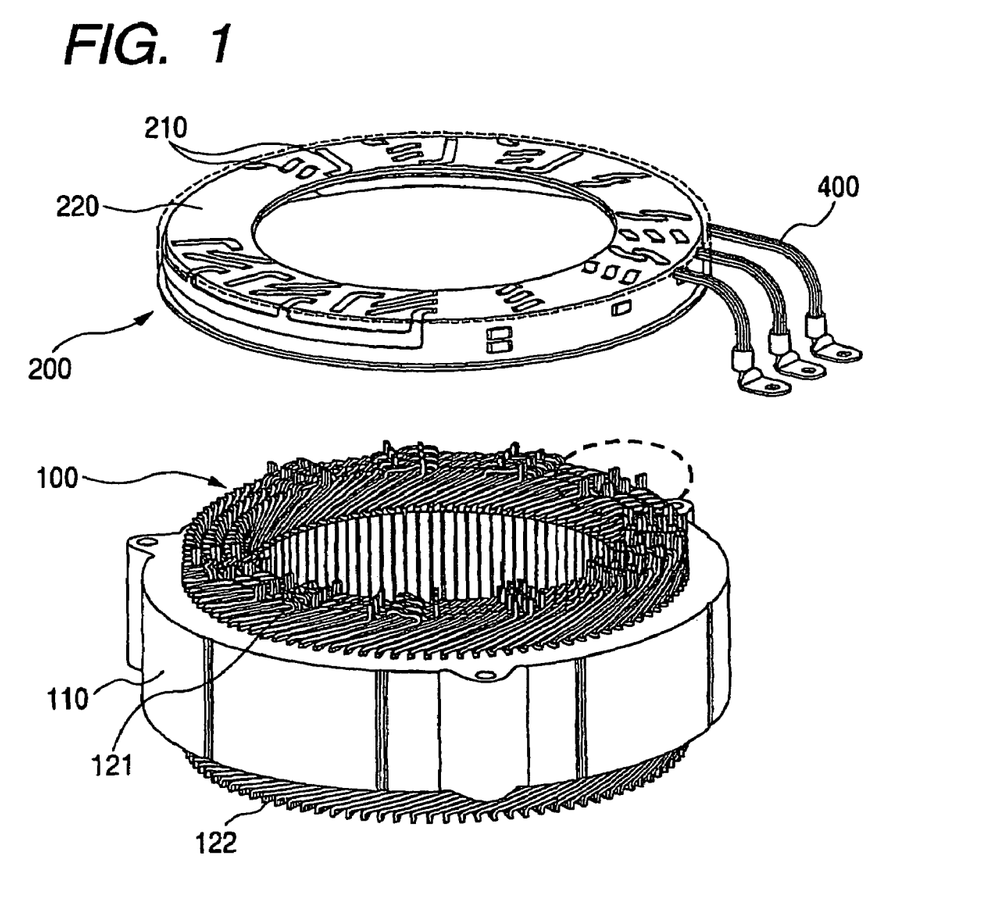
FIG. 1 is an exploded perspective view showing a stator portion of an electric rotary machine equipped with a stator coil including sequentially connected segment conductors in accordance with a preferred embodiment of the present invention.

FIG. 1 is a perspective view showing a stator coil including sequentially connected segment conductors in accordance with this embodiment. The stator coil of this embodiment includes a coil portion 100 and a terminal board 200. The coil portion 100, consisting of sequentially connected segment conductors, is wound around a stator core 110. The terminal board 200 serves as a bus bar array board of the present invention.

The coil portion 100 includes a head coil end 121 protruding in the axial direction from one end of the stator core 110 and a tail coil end 122 protruding in the axial direction from the other end of the stator core 110. The terminal board 200 is a resin molded ring plate member in which numerous bus bars are disposed so as to form a single layer or a plurality of layers. The terminal board 200 consists of a bus bar group 210 and an insulating member 220. The bus bar group 210 determines a connecting pattern of numerous partial coils arranging the coil portion 100 wound around the stator core 110. The insulating member 220 electrically insulates and supports the bus bars of bus bar group 210 at respective spatial positions. Respective bus bars of the bus bar group 210 are integrated together in the process of molding the insulating member 220. The bus bar group 210 has three output lines 400 protruding out of the terminal board 200.

Figure 2:
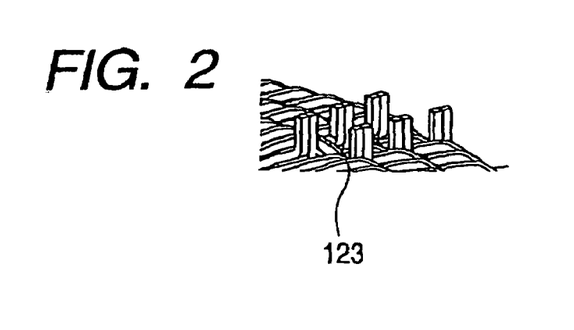
FIG. 2 is an enlarged perspective view partly showing the stator coil shown in FIG. 1.

The coil portion 100 wound around the stator core 110 includes numerous segment conductors whose end portions are connected at the tail coil end 122. FIG. 2 shows coil end portions 123 protruding outward in the axial direction from the head coil end 121. Each coil end portion 123 is formed by cutting the head portion of some segment conductors.

According to this embodiment, a rotor has 8-pole magnetic poles whose polarities are alternately changed in the circumferential direction. The stator core 110 has 96 slots (i.e. 4 slots per unit pole/phase). Each slot has twelve conductor insertion positions arrayed successively in the radial direction. As a result, a total of 576 (=96×12÷2) segment conductors are inserted in the stator core 110. A total of 12 slots are assigned to one pole. As the phase number is three, 4 slots are assigned to one pole/phase. Namely, the segment conductors inserted in mutually neighboring 4 slots are same phase. According to this embodiment, four segment conductors are sequentially connected according to a wave winding method to arrange one complete round (corresponding to 4 turns) of coil (hereinafter, referred to as a partial coil). It is needless to say that each partial coil can be arranged by combining the wave winding method and a lap winding or any other coil winding method.

Twelve conductor insertion positions are classified into three groups; i.e. 1st to 4th conductor insertion positions positioned at a radial inner side so as to cooperatively arrange an inner coil group layer, 5th to 8th conductor insertion positions positioned at a radial central portion so as to cooperatively arrange an intermediate coil group layer, and 9th to 12th conductor insertion positions positioned at a radial outer side so as to cooperatively arrange an outer coil group layer.

Respective segment conductors inserted in the inner coil group layer are sequentially connected to arrange four partial coils in each of four mutually neighboring slots of the same phase, thereby forming an inner coil group consisting of 16 partial coils. The inner coil group is simply referred to as a first layer in this embodiment.

Similarly, respective segment conductors inserted in the intermediate coil group layer are sequentially connected to arrange four partial coils in each of four mutually neighboring slots of the same phase, thereby forming an intermediate coil group consisting of 16 partial coils. The intermediate coil group is simply referred to as a second layer in this embodiment.

Similarly, respective segment conductors inserted in the outer coil group layer are sequentially connected to arrange four partial coils in each of four mutually neighboring slots of the same phase, thereby forming an outer coil group consisting of 16 partial coils. The outer coil group is simply referred to as a third layer in this embodiment.

Accordingly, the first to third layers wound around the stator core 110 for respective phases, i.e. the inner coil group, the intermediate coil group, and the outer coil group, cooperatively arrange the coil portion 100 wound around the stator core 110.

Each of the above-described three coil groups includes four conductor insertion positions in one slot. This means that one coil group includes four partial coils of the same phase accommodated in the same slot. It is not always necessary that respective partial coils pass the conductor insertion positions located at the same positions in the radial direction. Furthermore, according to this embodiment, four partial coils of the same phase are individually accommodated in each of the four slots of the same phase neighboring in the circumferential direction.

Hereinafter, the four partial coils belonging to the same coil group and accommodated in the same slot are referred to as "same-slot partial coil group." In short, each coil group (i.e. each layer) has 16 partial coils for each phase.

Figure 3:
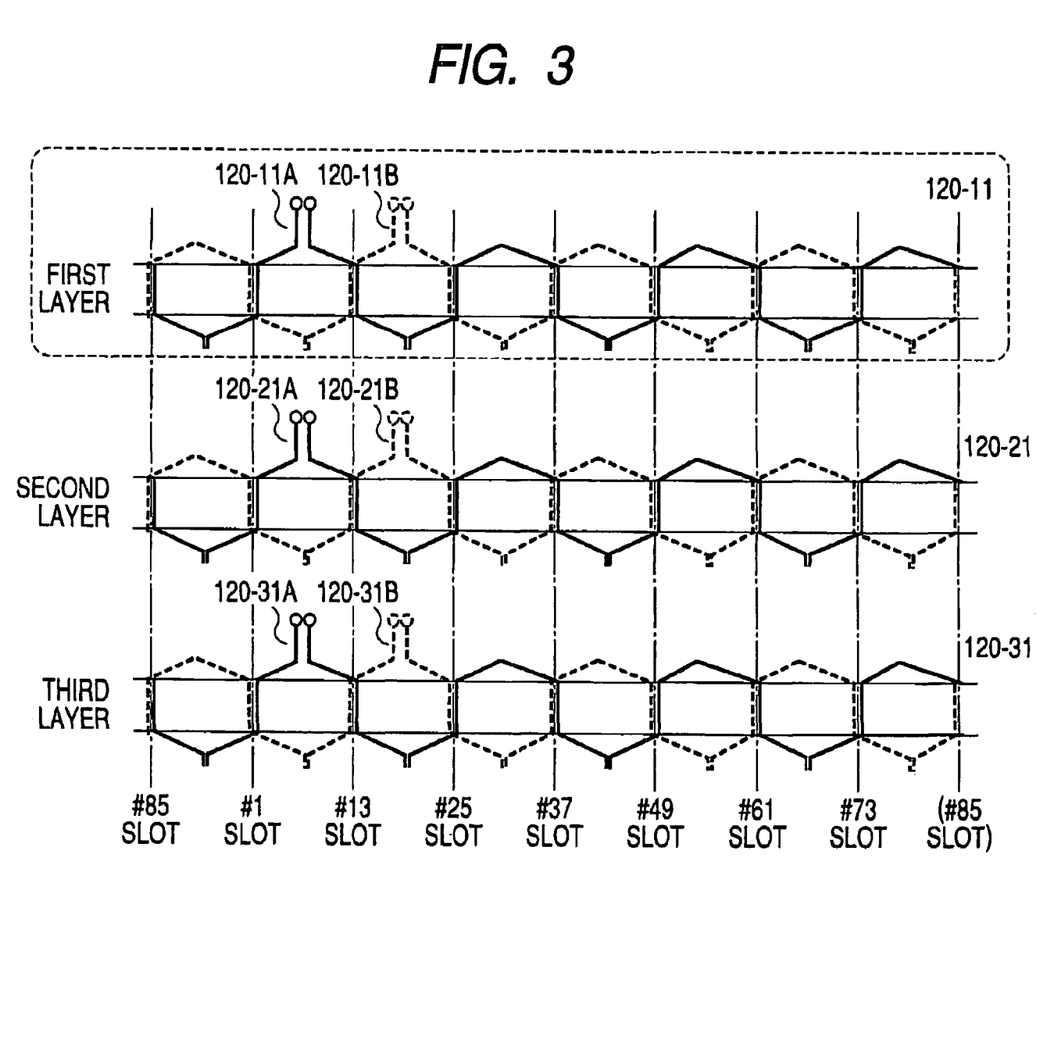
FIG. 3 is a diagram partly showing the winding arrangement of the stator coil of FIG. 1.

FIG. 3 shows the arrangement of the inner coil group (i.e. first layer), the intermediate coil group (i.e. second layer), and the outer coil group (i.e. third layer). However, for the purpose of simplifying the explanation, FIG. 3 only shows two partial coils of the four partial coils arranging each coil group.

More specifically, in FIG. 3, reference numeral 120-11A represents a first partial coil accommodated in a first slot of a predetermined phase in the first layer, and 120-11B represents a second partial coil accommodated in the first slot of this predetermined phase of the first layer. Similarly, a third partial coil 120-11C is accommodated in the first slot of this predetermined phase in the first layer and a fourth partial coil 120-11D is accommodated in the first slot of this predetermined phase of the first layer, although not shown in FIG. 3.

Furthermore, in FIG. 3, reference numeral 120-21A represents a first partial coil accommodated in a first slot of the predetermined phase in the second layer, and 120-21B represents a second partial coil accommodated in the first slot of this predetermined phase of the second layer. Similarly, a third partial coil 120-21C is accommodated in the first slot of this predetermined phase in the second layer and a fourth partial coil 120-21D is accommodated in the first slot of this predetermined phase of the second layer, although not shown in FIG. 3.

Furthermore, in FIG. 3, reference numeral 120-31A represents a first partial coil accommodated in a first slot of the predetermined phase in the third layer, and 120-31B represents a second partial coil accommodated in the first slot of this predetermined phase of the third layer. Similarly, a third partial coil 120-31C is accommodated in the first slot of this predetermined phase in the third layer and a fourth partial coil 120-31D is accommodated in the first slot of this predetermined phase of the third layer, although not shown in FIG. 3.

Figure 4:
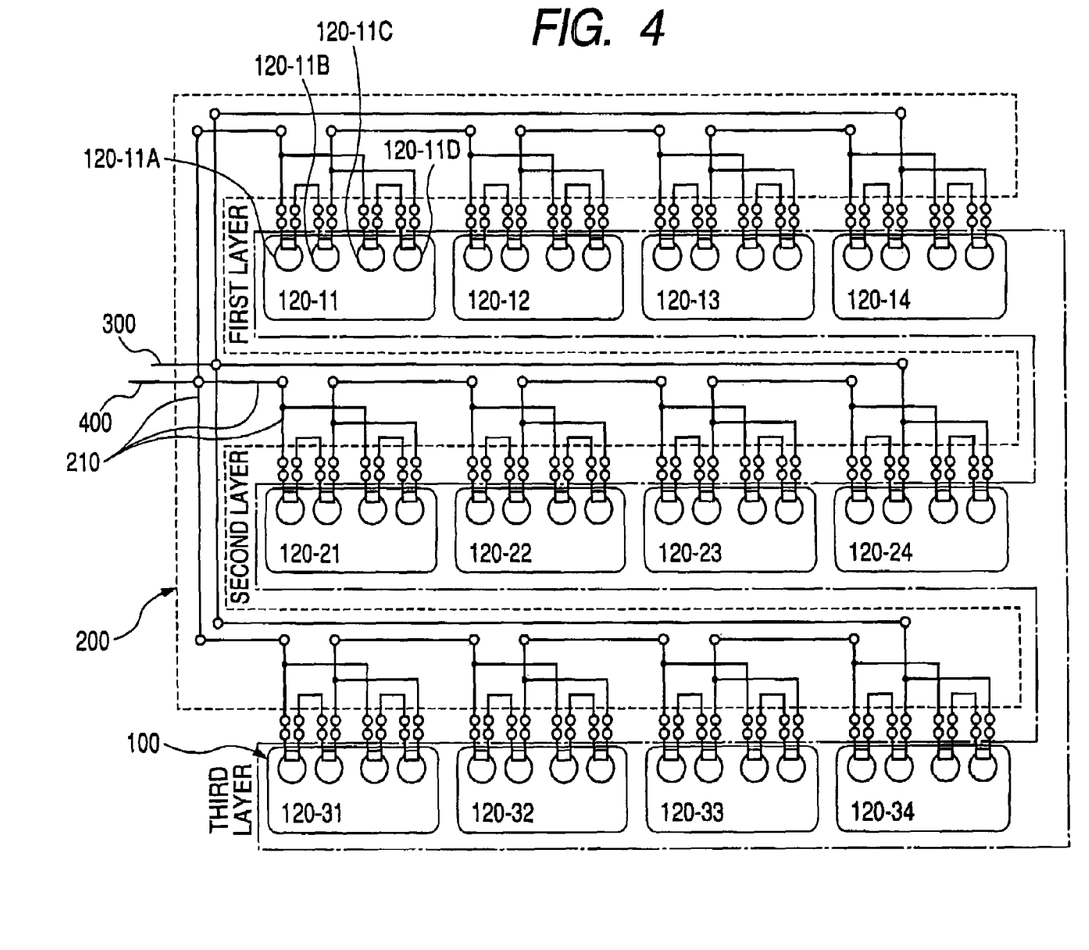
FIG. 4 is a diagram showing the connected condition of a coil portion of the stator coil shown in FIG. 1 and a terminal board in accordance with the preferred embodiment of the present invention.

FIG. 4 shows a connecting pattern of the same-slot partial coil groups of one phase (12 in total) and a bus bar group 210 of the terminal board 200 which connect these partial coil groups to arrange the phase coil of this phase. As described above, each same-slot partial coil group consists of four partial coils belonging to the same coil group and accommodated in the same slot.

In FIG. 4, the first layer consists of four same-slot partial coil groups 120-11, 120-12, 120-13, and 120-14. The second layer consists of four same-slot partial coil groups 120-21, 120-22, 120-23, and 120-24. And, the third layer consists of four same-slot partial coil groups 120-31, 120-32, 120-33, and 120-34. The final numeral suffixed to the end of each same-slot partial coil group represents the order in the circumferential direction to discriminate four same phase slots arrayed in the circumferential direction.

Two terminal ends of respective same-slot partial coil groups are serially connected by means of inter-slot crossover bus bars of the bus bar group 210. Furthermore, each same-slot partial coil group is arranged by individually forming two serial circuits each consisting of two partial coils being serially connected and then connecting these serial circuits in parallel with each other. For example, two partial coils 120-11A and 120-11B are serially connected to form a first serial circuit of partial coils. And, two partial coils 120-11C and 120-11D are serially connected to form a second serial circuit of partial coils. The first serial circuit and the second serial connect circuit are connected in parallel with each other to arrange the same-slot partial coil group 120-11.

As a result, each coil group (i.e. the first layer, the second layer, and the third layer) has 8 partial coils of 32 serial turns. Each coil group has one end connected to the output line 400 serving as an external connecting terminal protruding outward from the insulating member 220. Each coil group has the other end connected to a neutral line (i.e. neutral bus bar) 300. In this manner, the phase winding of 8 serial turns is arranged when one partial coil is regarded as 1 turn.

According to this embodiment, connection of the partial coils in the same slot of the same layer, connection of the same-slot partial coil groups in different slots of the same layer, connection between different layers, as well as the output line 400 and the neutral line 300, are all arranged by the bus bar group 210 of the terminal board 200. Of course, the terminal board 200 accommodates bus bars belonging to other phases as the rest of the bus bar group 210. From the above-described arrangement, it will be understood that a complicated crossover structure can be accomplished by preparing the terminal board 200 and simultaneously connecting both ends of respective partial coils, appropriately arranged by cutting the head coil end 121 of the coil portion 100 wound around the stator core, to front ends of predetermined bus bars of the terminal board 200.

Figure 5:
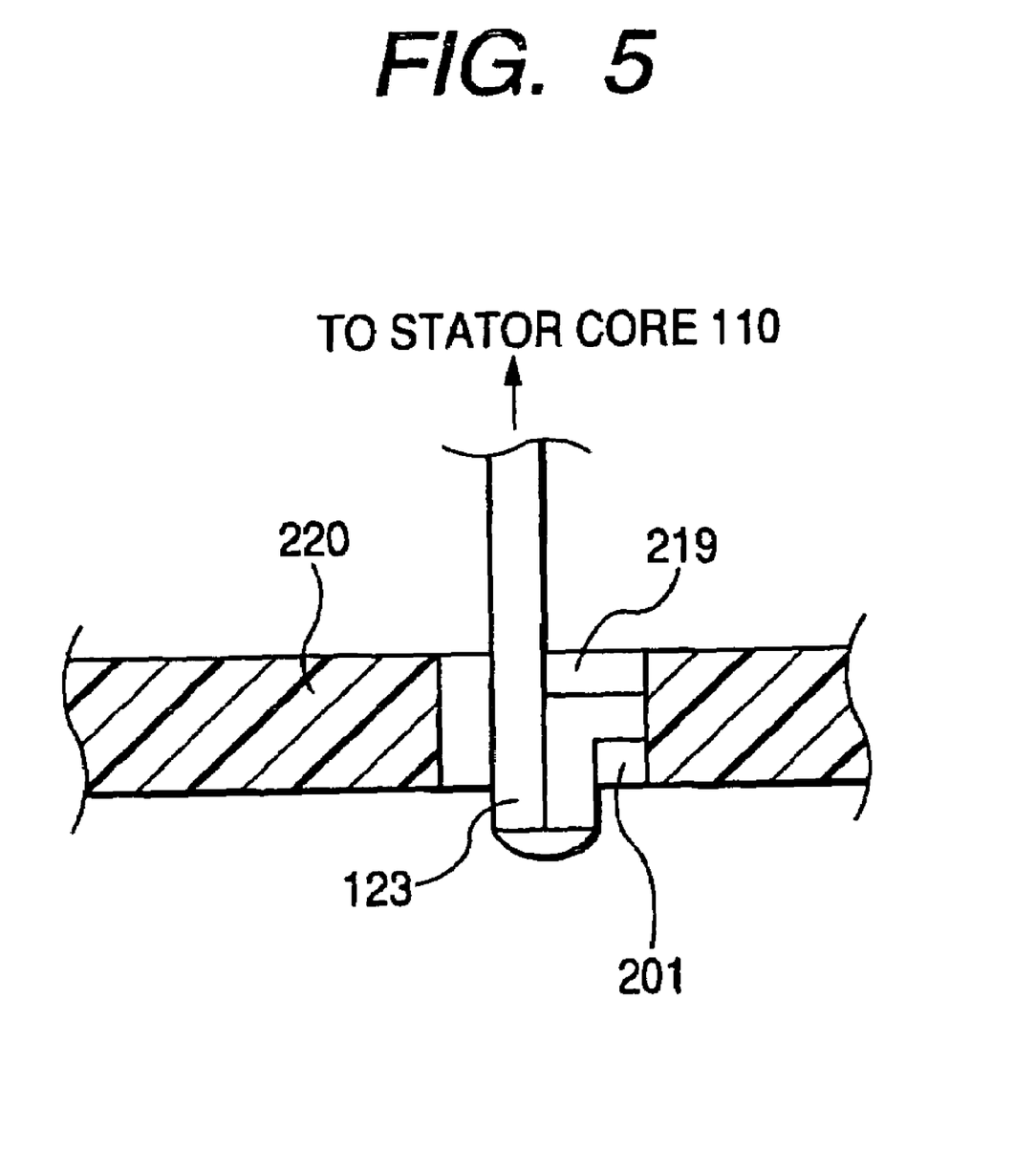
FIG. 5 is an enlarged cross-sectional view partly showing the connected condition of a bus bar of the terminal board and a coil portion wound around a stator core in accordance with the preferred embodiment of the present invention.

FIG. 5 is an enlarged plan view partly showing the terminal board 200. The terminal board 200 has a window portion 201 from which the above-described connecting portion is exposed. More specifically, in the window portion 201, the coil end portion 123 of the partial coil is brought into contact with the front end of a corresponding bus bar 219 connecting the partial coils. Then, all of the contact portions are simultaneously or sequentially connected. The contact condition of the coil end portion 123 of the partial coil and the front end of the corresponding bus bar 219 in the window portion 201 is not limited to the arrangement shown in FIG. 5. Furthermore, the segment conductor forming the cut portion of the partial coil has a head portion longer than that of other segment conductor as shown in FIG. 2. Furthermore, it is possible to cut the segment conductor to form the cut portion before it is inserted into the slot.

Figure 6:
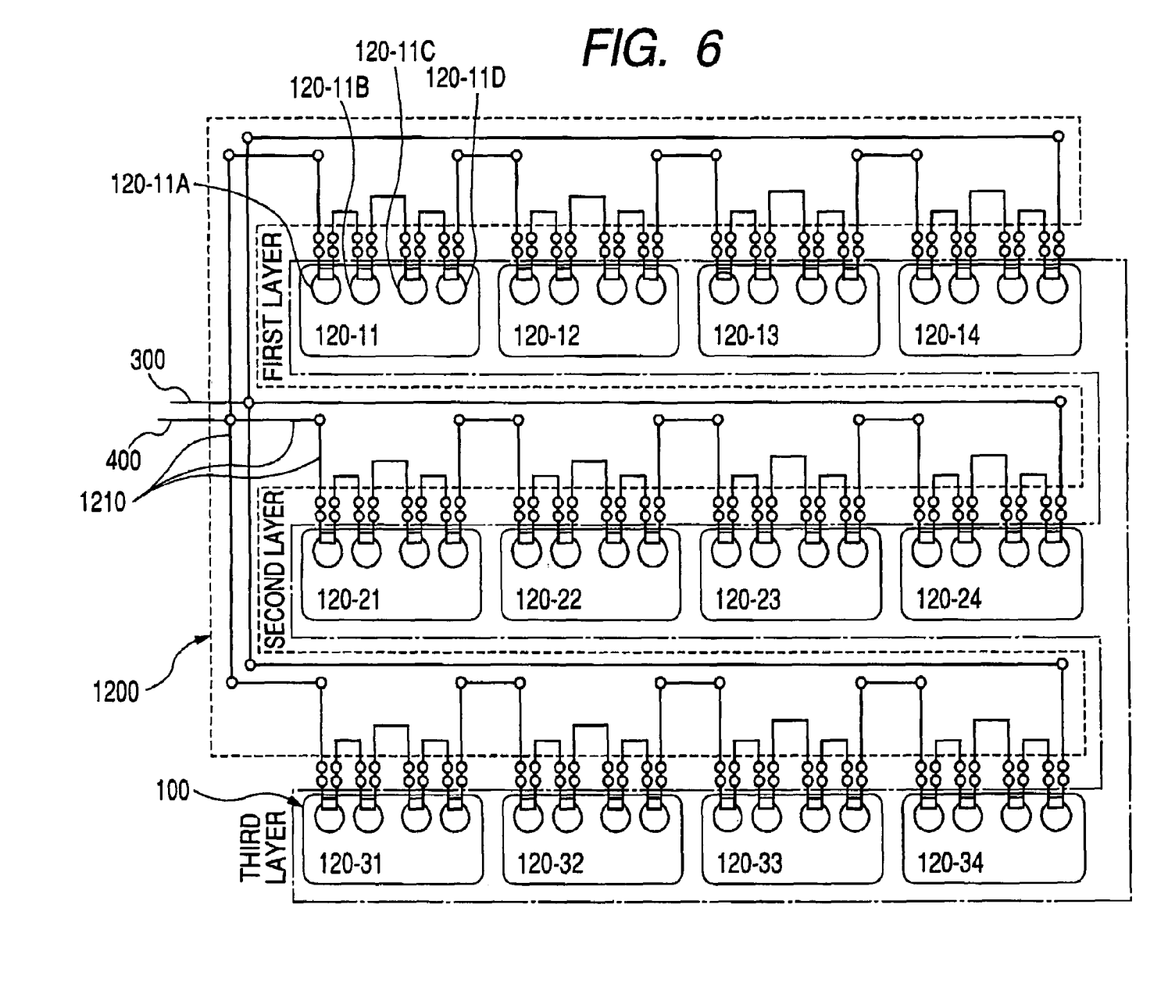
FIG. 6 is a diagram showing the connected condition of the coil portion of the stator coil shown in FIG. 1 and another terminal board in accordance with the preferred embodiment of the present invention.
Figure 7:
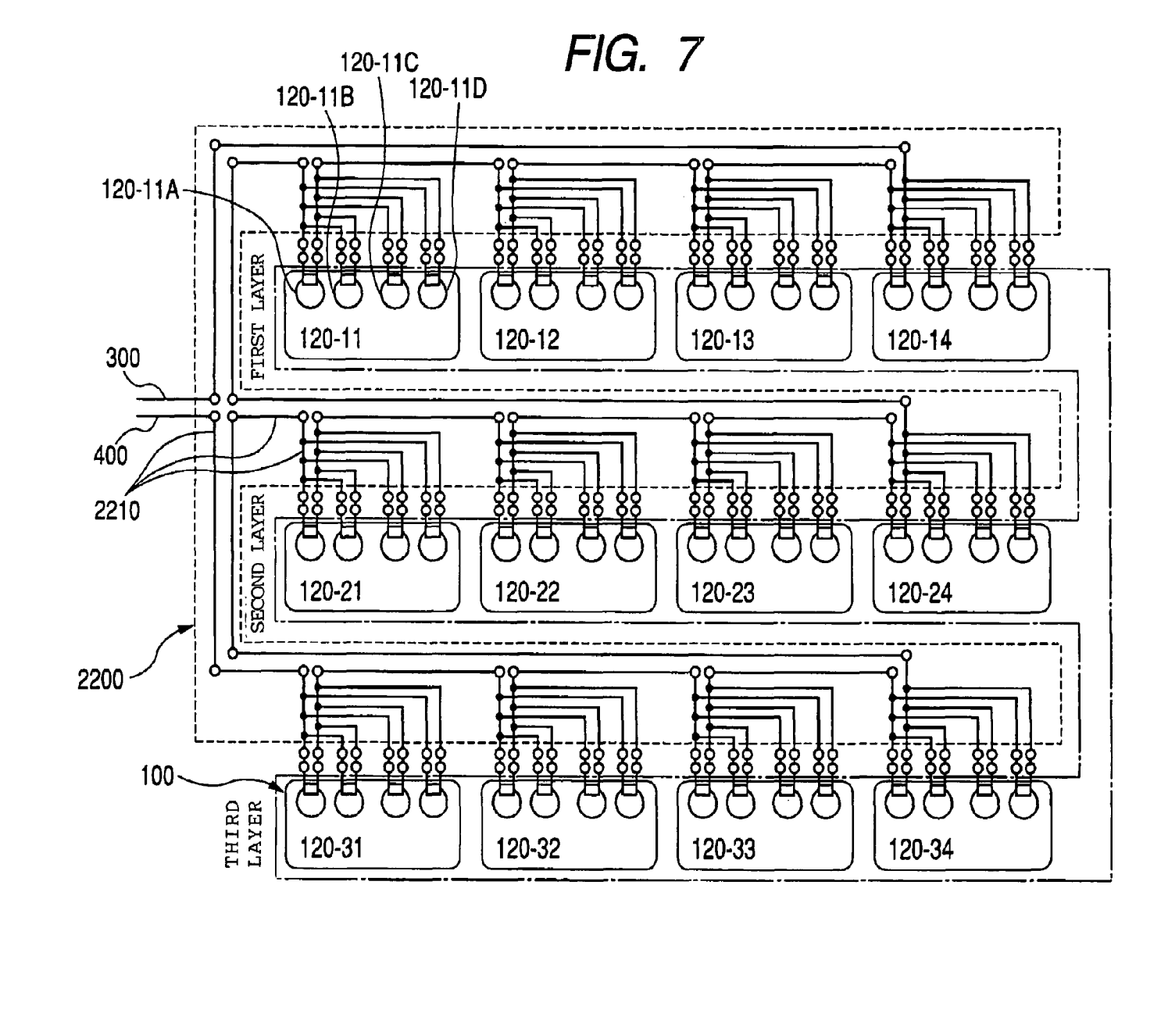
FIG. 7 is a diagram showing the connected condition of the coil portion of the stator coil shown in FIG. 1 and another terminal board in accordance with the preferred embodiment of the present invention.

As easily understood from the above explanation, the serial turn number of the phase coil is easily adjustable by changing the bus bar arrangement of the terminal board 200. FIGS. 6 and 7 show modified examples of the terminal board. Using a terminal board 1200 of FIG. 6 enables the phase coil to have 16 serial turns. Using a terminal board 2200 of FIG. 7 enables the phase coil to have 12 serial turns.

Figure 8:
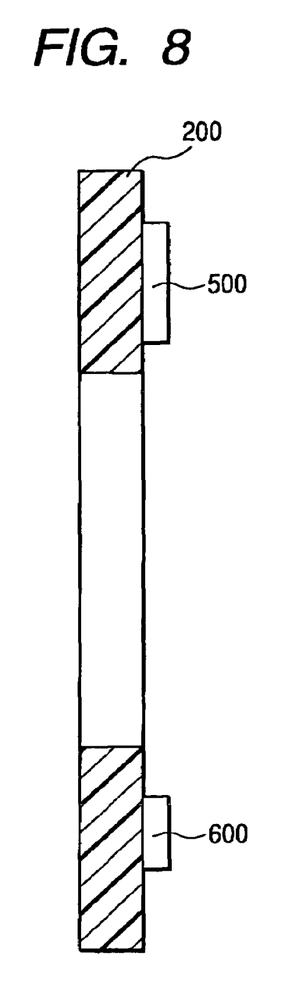
FIG. 8 is an enlarged side view partly showing a terminal board mounting a control circuit in accordance with a modified embodiment of the present invention.

A modified embodiment of the present invention will be explained with reference to FIG. 8. According to this modified embodiment, a three-phase inverter circuit 500 including a plurality of power IGBTs (e.g. six in total) and a control circuit 600 including a controller IC for controlling the inverter circuit 500 are mounted on the terminal board 200. AC output terminals of the three-phase inverter circuit 500 are connected to the output lines 400 of respective phases of the bus bar group 210. According to this modified embodiment, the output lines 400, i.e. the external connecting terminals, of the bus bar group 210 are connected to AC output terminals of the three-phase inverter circuit 500. The bus bars, forming DC input terminals of the three-phase inverter circuit 500, serve as DC power source terminals protruding from the terminal board 200 and connected to an external DC power source.

This modified arrangement brings the effect of reducing the wiring inductance and the wiring resistance between the three-phase inverter circuit 500 and the stator coil, and also brings the effects of further downsizing the apparatus and reducing the total number of required parts.

Figure 9:
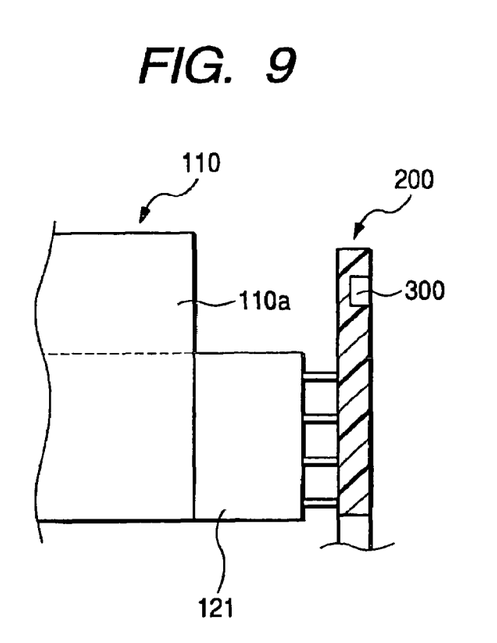
FIG. 9 is an enlarged cross-sectional view partly showing a terminal board in accordance with another modified embodiment of the present invention.

Another modified embodiment of the present invention will be explained with reference to FIG. 9. This modified embodiment is characterized in that the bus bar of neutral line 300 is disposed near an outer peripheral portion of the terminal board 200 so that the bus bar of neutral line 300 and a core back 110a are positioned at substantially the same position in the radial direction. According to this modified arrangement, the neutral line 300 can be easily disposed without interfering with other bus bars of the terminal board 200. Thus, the bus bar layout of the terminal board 200 can be simplified.

In a case that the stator coil including sequentially connected segment conductors according to the present invention is employed for an automotive generator, the three-phase inverter circuit 500 can be replaced with a diode type three-phase full-wave rectifier. Although the above-described embodiments are explained based on an example of the three-phase motor, it is possible to change the phase number.

What is claimed is:

1. A stator coil of a stator core, comprising:
    a plurality of segment conductors for each of a plurality of phases; and
    a bus bar array board having bus bars which connect the segment conductors for each phase, wherein
    each segment conductor includes a pair of leg portions individually inserted into two slots of the stator core and one head portion continuously formed with said pair of leg portions and disposed at a head coil end of the stator core,
    the leg portions of said segment conductors of each phase are sequentially connected at a tail coil end of the stator core such that the segment conductors form a coil group for each slot, such that each coil group is composed of a plurality of partial coils formed of the corresponding segment conductors and such that a plurality of coil groups of the slots of each phase occupy a plurality of coil group layers defined so as to be disposed along a radial direction of the stator core,
    said bus bars of said bus bar array board are classified into a plurality of first crossover bus bars, a plurality of second crossover bus bars, a plurality of third crossover bus bars, and an electric insulating member, insulating the first, second and third crossover bus bars from one another,
    each of said first crossover bus bars is disposed to connect two end portions of two partial coils of the same coil group;
    each of said second crossover bus bars is disposed to connect two end portions of two partial coils of two different coil groups of the same coil group layer, and
    each of said third crossover bus bars is disposed to connect two end portions of two partial coils of two different coil groups of two different coil group layers of the same phase.

2. The stator coil in accordance with claim 1, wherein said first, second and third crossover bus bars are integrally molded with said insulating member.

3. The stator coil in accordance with claim 1, wherein said partial coils connected with one another through said first, second and third crossover bus bars form a phase coil for each phase, and said bus bar array board has a terminal bus bar serving as an external connecting terminal which is connected to one end of each phase coil and said terminal bus bars protrudes from said insulating member.

4. The stator coil in accordance with claim 3, wherein said bus bar array board has a neutral bus bar connecting other ends of the phase coils of the phases, and said neutral bus bar extends in a circumferential direction of said stator coil.

5. The stator coil in accordance with claim 4, wherein said neutral bus bar is disposed at a position substantially identical with a core back of said stator core in the radial direction.

6. The stator coil in accordance with claim 1, wherein said first, second and third crossover bus bars are exposed to a window portion of said insulating member, and are connected to the end portions of the partial coils inserted in said window portion.

7. The stator coil in accordance with claim 1, wherein said bus bar array board is disposed adjacently to the head coil end in an axial direction of said stator coil and elongated in the radial direction.

8. The stator coil in accordance with claim 1, wherein said partial coils connected with one another through said first, second and third crossover bus bars form a phase coil for each phase, and a semiconductor switching element is fixed to said bus bar array board and is connected to one ends of said phase coils.

9. The stator coil in accordance with claim 1, wherein said bus bar array board is selectable from a plurality of array boards mutually differentiated in a bus bar arrangement, and a serial turn number of each phase is adjustable by changing a connecting pattern of said partial coils.

10. The stator coil in accordance with claim 1, wherein said first crossover bus bars connect the end portions of said partial coils with each other such that the number of partial coils serially connected with one another is set at a first changeable number to form a plurality of serial circuits connected in parallel with one another for each phase, and the number of serial circuits connected in parallel is set at a second changeable number for each phase.

* * * * *